March 21, 1961  A. J. ANTONIADES ET AL  2,976,066
COMPRESSION TYPE HIGH TEMPERATURE SEAL
Filed Sept. 30, 1957  2 Sheets-Sheet 1

INVENTORS
ARTHUR J. ANTONIADES
EDWARD J. BIGELOW
BY
Charles F. Dischler
ATTORNEY March 21, 1961  A. J. ANTONIADES ET AL  2,976,066
COMPRESSION TYPE HIGH TEMPERATURE SEAL
Filed Sept. 30, 1957  2 Sheets-Sheet 2

INVENTORS
ARTHUR J. ANTONIADES
EDWARD J. BIGELOW
BY
Charles F. Dischler
ATTORNEY United States Patent Office 2,976,066
Patented Mar. 21, 1961

2,976,066

COMPRESSION TYPE HIGH TEMPERATURE SEAL

Arthur J. Antoniades, Gardena, and Edward J. Bigelow, Torrance, Calif., assignors to North American Aviation, Inc.

Filed Sept. 30, 1957, Ser. No. 687,180

3 Claims. (Cl. 286—10)

This invention relates to the sealing of members having relative reciprocatory motion and in particular it relates to a compression-type metal seal capable of repeated cycling and long life under severe temperature and pressure environmental conditions.

As pointed out in copending application Serial No. 679,465, filed August 21, 1957, future aircraft and missile systems will be required to operate in increasingly higher temperature and pressure ranges. The next immediate step forward in the aircraft hydraulic art contemplates a system operating temperature range from —65° F. to 400° F., and a pressure of 3,000 p.s.i.g., or, as designated by Army-Navy specifications, a Type III hydraulic system. Beyond the Type III system, a working temperature range of —65° F. to 450° F. and a pressure of 4,000 p.s.i.g. is next in prospect.

Previously known seals are not adequate at these temperatures and at this pressure; and the present invention has resulted from an intensive developmental program designed to determine the optimum configuration and materials for such high temperature seals.

This invention contemplates an elastically deformable metal seal adapted to be biased into wiping contact to form a dynamic seal with the surface to be sealed by a spring-like compression member which in turn comprises a static seal.

Accordingly, it is an object of this invention to provide a dynamic seal having a working range at higher temperatures and pressures than has been heretofore possible.

It is also an object of this invention to provide a seal which is self-energized and thereby provides continual contact between mating surfaces at all times and under all conditions of temperature and pressure.

It is another object of this invention to provide a seal that has a simple configuration and is easily manufactured at a low cost.

It is still another object of this invention to provide a seal that may be assembled rapidly and without difficulty and which has a sealing insert that is readily replaceable when worn.

Still another object of this invention is the provision of a sealing arrangement having no elastomeric or synthetic gaskets, rings, or packings.

A further object is the use of different materials for the ferrule and seal insert whereby, as required, a low modulus, low strength seal insert material can be used with a high modulus, high strength ferrule material. Conversely when warranted by the application, the material choice can be reversed.

These and other objects and advantages of the present invention will become apparent to those skilled in the art after reading the present specification and the accompanying drawings forming a part thereof, in which Fig. 1 is a longitudinal view, partly in elevation and partly in cross section, of a preferred embodiment of the sealing arrangement of this invention as applied to a cylinder end and piston rod;

Figure 1:
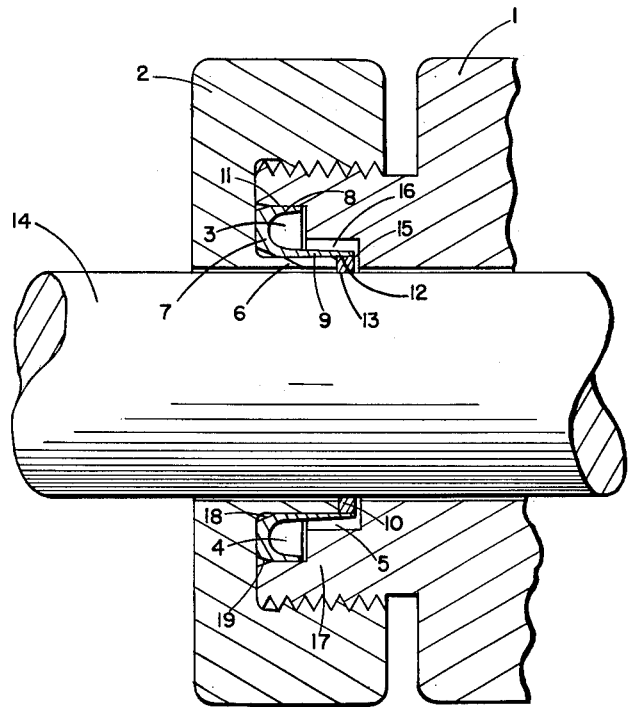
Figure 3:
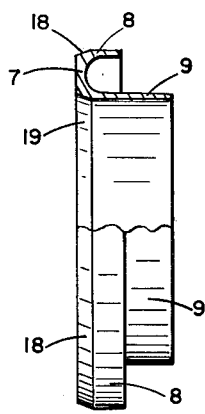
Fig. 3 is a view, partly in section, of a ferrule for sealing a piston rod.

Referring specifically to the drawings wherein like reference characters have been used throughout the several views to designate like parts, and referring at first to Fig. 1, reference numeral 1 designates a cylinder head end having a reciprocable piston rod 14 passing therethrough with relatively reciprocable concentric mating surfaces. A threaded axially extending annular boss 17 projects from head 1 and has an axial bore 4 formed in the end thereof with a smaller diameter countersunk bore 5 next adjacent the piston rod 14 whereby annular chambers of successively smaller diameter are formed in the boss. A gland nut 2 having annular hub portion 6 extending along and closely surrounding a portion of shaft 14 is adapted to threadedly engage boss 17. Longitudinally extending hub portion 6, in conjunction with bores 4 and 5, forms an internal chamber or groove 3 and a seal groove 15 opening radially inwardly from the mating surface of the cylinder head end. These grooves are connected by longitudinally extending chamber 16.

Metal seal insert 10 is positioned in groove 15 and is adapted to bear against the circumferential surface of piston rod 14 and have a wiping surface contact therewith. To bias seal 10 into intimate contact with the piston rod, a compression member or ferrule 7 is provided for insertion into bores 4 and 5 and is adapted to bear against the outer surface of seal 10.

The principal novelty of the present invention resides in the unique structure and manner of functioning of the ferrule 7 whereby self-energizing dynamic sealing arrangements, as well as static sealing arrangements are provided at all times. Having an interference fit within the groove 3 and consequently being acted on by compressive forces the ferrule serves to exert a radial force around the circumference of the sealing insert, while at the same time providing a static seal against fluid leakage where ferrule inner lip 9 contacts the exterior circumference of seal insert 10, designated by numeral 12, and at the surface junction between ferrule lip 8 and the wall of groove 4, as indicated by numeral 11. Thus, ferrule 7 has the primary function of assuring the dynamic seal at point 13, as well as the function of providing static sealing at the faying surface contact faces, as designated by numerals 11 and 12.

Ferrule 7 comprises an annular metallic member, having a generally U-shaped cross section with the base portion of a somewhat greater thickness than the extending lips. The corners of the base of the U-shaped member have a flat chamfer as shown at 18 and 19, to assure proper clearance over groove corner fillets, upon installation. In the embodiment of Fig. 1, inner ferrule lip 9 is of greater length than the outer ferrule lip 8 and extends longitudinally over the outer circumference of seal ring 10. Positive dynamic and static sealing is achieved by forming ferrule 7 to an interference fit with the outer wall of gland 3 and the exterior circumference of the seal insert when in an unbiased, unstressed state whereby upon insertion of the ferrule the compressive stresses induced therein act to expand the ferrule lip 8 against the gland groove walls at 11, and ferrule lip 9 against the outer circumference of the seal insert at 12, thereby biasing the seal ring 10 radially inwardly into engagement with the piston rod and achieving dynamic sealing at the surfaces thereof. The required initial ferrule interference is of the order of a few thousands with tests indicating the optimum interference fit to vary from a minimum of 0.001 inch to as much as 0.0040 of an inch. Unless the assembly interference is within this general optimum range it has been found that early failure will occur. Too high an interference results in high friction and permanent deformation of the ferrule material as well as resulting in accelerated wear with consequent early failure. Too low of an interference fit will result in leakage at low pressures as well as reducing the time during which positive sealing may be maintained during operation. A line-to-line fit, or a condition where the rod seal inner diameter is greater than the rod outer diameter may result in immediate failure. Measurements of rod seals, both before and after test runs, have shown conclusively that as soon as the seal inner diameter becomes equal to the rod outer diameter excessive leakage invariably resulted. Thus, the compressive action of the ferrule lip 9 maintains a continuous radial biasing force on seal ring insert 10, so that the effects of initial clearance and subsequent wear during operation will be overcome and seal ring 10 will be in contact with rod 14 at all times.

Figure 8:
Fig. 8 is a view, partly in section, of a different ferrule configuration.

The ferrule cross section may take many possible configurations dependent only on the materials used, the applicable design conditions and the results desired. As shown in Fig. 1, the inner ferrule lip which contacts the seal insert has a relatively long tapered cross section. The ferrule of Fig. 2, on the other hand, has a short relatively thick, ferrule lip for biasing contact against the seal. The optimum ferrule configuration is a matter of design and may take a shape intermediate that of either of these two figures or may be of a stepped configuration similar to that shown in Fig. 8.

Figure 2:
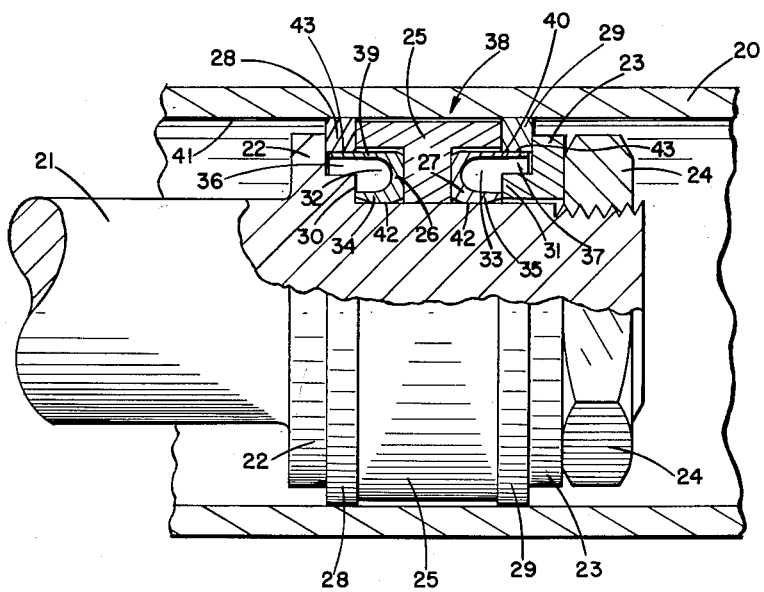
Fig. 2 is a longitudinal view, partly in elevation and partly in cross section, of an embodiment of this invention as applied to seal the clearance gap between a piston and cylinder.
Figure 4:
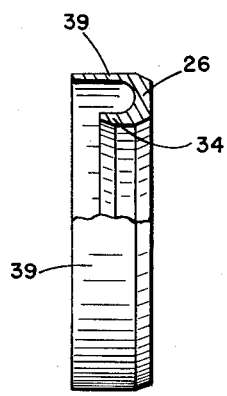
Fig. 4 is a similar view, partly in section, of a ferrule for use in a piston seal arrangement.

It will be obvious to those skilled in the art that the sealing arrangement of this invention is equally applicable to external sealing glands as well as the internal type of gland described above. As shown in Fig. 2, the present sealing arrangement is adapted for use with a piston-cylinder combination. As shown, a piston rod 21 having an integral piston 22, is slidably reciprocable within cylinder 20. The sealing arrangement 38 is secured between the shoulder 30 formed on piston 22 and an L-shaped support member 23, all compressed and held in position by nut 24 engaging the threaded end of piston rod 21. Intermediate of piston 22 and support 23, a T-shaped spacer member 25 cooperates with the latter two structural elements to form two annular sealing grooves 36, 37 facing the working surface of the cylinder barrel 20 and two interior grooves 32, 33 in communication with these sealing grooves 36 and 37, respectively. Identical ferrules 26 and 27 occupy grooves 32 and 33, respectively, with their outer lips 39 and 40 extending into their respective sealing grooves 36 and 37, to support and bias annular sealing rings 28 and 29 into engagement with the cylinder wall 41. Inner lips 34 and 35 of the ferrules are placed in compression between shoulder 30, on piston 22, and shoulder 31, on support 23, and the base of the T-shaped spacer 25, respectively. It will be noted that each of the inner grooves 32, 33 opens directly into the sealing grooves 36, 37, respectively, and do not communicate through a third chamber, or passageway, and that thus, the outer lips 39, 40 of the respective ferrules are shorter in length and less resilient than the relatively long, slightly tapered seal biasing ferrule lip 9 shown in Fig. 1.

For the piston cylinder combination of Fig. 2 static sealing is achieved at the faying surfaces indicated by numeral 42 by the use of an interference fit between the outer diameter of the rod 21 and the inner diameter of the ferrules 26 and 27, and an interference fit at 43 between the inner diameter of the annular seals 28, 29 and the outer diameter of the ferrule lips 39 and 40. As previously explained, this also has the advantage of imparting an elastic support for the seal which continuously biases the seal into wiping engagement with the adjacent movable surface.

For this embodiment dynamic sealing is accomplished at the cylinder wall 41 by an interference fit, after assembly, between the outer circumferential surface of the seal 28 and 29 and the inner surface of the cylinder 20. The compressive action of the outer ferrule lips 39, 40 maintains a constant force on the seal inserts 28 and 29, respectively, so that the effects of initial clearance, before assembly, and subsequent wear during operation are overcome by contact with the cylinder wall 41 at all times. The piston 22 and support 23 and the spacer 25 insure the proper positioning at all times of the annular seals 28, 29, with the entire assembly being secured and placed under compression by nut 24.

The arrangements of the present invention have the advantage of allowing the use of a seal ring insert of a simple configuration which may be made at low cost as a throwaway item. The embodiments of Figs. 1 and 2 show the annular seal as a rectangular solid insert. Such a seal configuration is preferably used when the material combination of the seal and its complementary working surface results in a low coefficient of friction and where the seal material has a relatively low compressive strength and low modulus of elasticity, and is easily compressed by the ferrule. None of the seal inserts or ferrules of the disclosed embodiments are of the split-type; however, split seals and ferrules can be used, but with consequently less effective sealing.

Figure 5:
Fig. 5 is a sectional view of a modification of the seal ring insert.

Fig. 5 illustrates a slotted seal ring insert for use when the combination of the seal ring material and its complementary sliding surface results in a low coefficient of friction, but the seal material has a relatively high strength and high modulus of elasticity and is not easily compressed by the ferrule. The slotted construction permits the ferrule to effectively bias the otherwise relatively rigid seal insert into wiping engagement with the mating surface.

Figure 6:
Fig. 6 is a view, partly in section, of another modification of the seal ring insert.

The grooved or labyrinth-type seal insert of Fig. 6 illustrates a seal of an overbalanced type which may be used where the material combination results in a high coefficient of friction and where the seal material is of relatively low strength and easily compressible by the ferrule. A hydraulically overbalanced seal results in increased unit area bearing pressures at the sealing surface. Such a seal has the ability to prevent any foreign material that may work its way into the seal from scratching completely across the sealing surfaces.

Figure 7:
Fig. 7 is a view, partly in section, of a further modification of the seal ring insert.

The seal insert can also be hydraulically underbalanced as shown for a rod seal in Fig. 7. Underbalancing assists in decreasing insert wear by decreasing the normal unit area load at the dynamic sealing surface.

Extensive tests have been conducted in a curvilinear test stand at the temperatures and pressures of a Type III hydraulic system, and at even more elevated temperatures and pressures, in an effort to determine the best materials, and their optimum arrangement and dimensions, for achieving a maximum sealing effect with the minimum friction and wear between the mating surfaces. The curvilinear test stand comprises a reciprocating piston-type actuator or test cylinder pivotally mounted on one end with the piston rod pivotally connected to one end of a bellcrank which has its other end connected to a load cylinder. The resulting curvilinear movement of the piston rod end introduces eccentric loading stresses into the seal structure. Eccentric or side loads signify the force component that is normal to the axial cylinder load. These loads tend to increase with an increase in the amount of clearance between the seal and the mating surface and provide a test of the seal structure that is at least as severe as the conditions which would be encountered in actual operational use.

A test program conducted under the operating conditions of a Type III system (i.e., at 3,000 p.s.i.g. and with the temperature cycled between —65° F. and 400° F.) and under conditions even more severe (—65° F. to 450° F. and 4,000 p.s.i.g.) has indicated the importance of the proper combination of seal and mating cylinder rod or cylinder barrel materials in order to prevent excessive wear, deformation, galling and even eventual seizure of the materials.

In general, as a consequence of the development program from which this invention resulted, it is now apparent that for the high temperatures and pressures under consideration, a hard seal surface against a hard rod or cylinder wall surface is required for positive sealing over extended periods of time. Analysis also indicates that improper choice of materials will result in addition to wear and galling problems, in uncontrolled stress concentrations and contraction and expansion.

Among the suitable combination of metals tested, it has been found that Meehanite against molykoted nitrided Nitralloy produces the best results under these conditions. Another suitable combination comprises Meehanite against a flame-plated tungsten carbide surface. Meehanite is a high carbon content cast iron manufactured by the Meehanite Metal Corporation of New Rochelle, New York. In an "as machined" condition it has very good wear characteristics against nitrided Nitralloy. Nitralloy is composed of 0.38 to 0.43% carbon, 0.50 to 0.70% manganese, a maximum of 0.04% phosphorus, a maximum of 0.04% sulphur, 0.20 to 0.40% silicone, 1.4 to 1.8% chromium, 0.30 to 0.40% molybdenum, 0.95 to 1.30% aluminum and the remainder of iron. This alloy has very good wear characteristics for this type of application. Molykote X–106, manufactured by the Alpha Molykote Corporation, is a dry lubricant suitable for coating wearing surfaces to reduce friction and wear and is composed primarily of molybdenum disulfide in a resin toluol solution and is well suited for use with the metal seal arrangements of this invention.

Upon raising the test conditions to even more severe limits (—65° F. to 450° F. and 4,000 p.s.i.g.) the combination of nitrided Nitralloy against flame-plated tungsten carbon was found to give the best results during thermal cycling between these temperature limits.

The sealing arrangements of Figs. 1 and 2 set forth a seal which is self-energizing and which thereby makes continual contact between the seal and the mating surface at higher temperatures and pressures than are now possible under dynamic loads. Additionally, it performs the function of static sealing between the dynamic seal and the surrounding body members. The present design, with the proper choice of combinations of materials, has given a seal structure that is able to operate efficiently at extremely high temperatures and pressures with a minimum of wear of the seal insert and with very low values of rod wear.

The present invention therefore provides a two-piece sealing arrangement wherein the separate metal ferrule and seal may be optimally selected for the performance of specific functions. Thus, in general, the seal insert will normally be of a low modulus of elasticity, low strength material that has a low coefficient of friction on a complementary sliding surface but which has a high degree of resistance to wear. The ferrule, on the other hand will normally be of a material having high strength, a high modulus of elasticity and in general having the qualities of a good spring material. Additionally it should be a material that will form an efficient static seal.

While particular embodiments of this invention have been illustrated and described herein, it will be apparent that various changes and modifications may be made in the construction and arrangement of the various parts without departing from the spirit and scope of this invention in its broader aspects or as defined in the following claims.

We claim:
1. A fluid seal for high temperature, high pressure sealing between two relatively translatable members having slidably fitted complementary cylindrical working surfaces with a clearance gap therebetween, one of said members containing a first annular groove within said member and a second annular groove in the cylindrical working surface of said member connected to said first annular groove, an annular metal seal ring disposed in said second groove in wiping contact with said other working surface, an annular U-shaped metal compression member positioned in said first groove, said compression member having substantially parallel lip portions extending in an axial direction, one of said lip portions being of greater length than the other lip portion and extending into said second groove to bear against the outer surface of said annular insert whereby the same is biased radially into wiping contact with said other cylindrical working surface to dynamically seal the same.

2. In combination, a first member having a surface; a second member having a surface in sliding contact with said first member and reciprocable relative thereto; one of said members having a first groove in the surface thereof; a low elastic modulus, low strength metallic seal disposed in said first groove in dynamic fluid sealing engagement with the surface of said other member; said one member further having a second groove of larger cross section than said first groove, said second groove including a restricted longitudinally extending opening communicating with said first groove; a longitudinally extending U-shaped high elastic modulus, high strength, metallic compression member having one relatively short lip portion interferingly positioned in said second groove to form a static seal with the outer wall of the second groove and having one longitudinally extending lip portion of greater length than the relatively short lip portion extending longitudinally through the restricted opening and forcibly contacting said seal on a surface opposite its dynamic sealing surface to form a static seal therewith, said longer lip portion being elastically deformed by reason of an interference fit of said compression member within said second groove to continuously bias said seal into engagement with the surface of said other member substantially independently of fluid pressure whereby said seal forms a dynamic fluid seal with the surface of said other member.

3. A high-temperature, high-pressure piston rod seal comprising a cylinder head having a bore formed in the exterior thereof surrounding the piston rod and forming a first cylindrical chamber therearound and further including a longitudinally extending counterbore forming a second cylindrical chamber surrounding the piston rod of reduced cross section communicating with said first cylindrical chamber; an annular end closure member adapted to engage the exterior of said cylinder head and having an axially extending cylindrical portion surrounding the piston rod and extending through said first cylindrical chamber and into said second cylindrical chamber and forming therewith first and second annular grooves, respectively, with said first annular groove being of greater cross sectional area than said second annular groove; an annular metal seal ring disposed in said second groove in wiping contact with said other working surface; an annular U-shaped metallic compression member having substantially parallel unequal length lip portions extending in an axial direction with the relatively short lip portion interferingly positioned in said first groove to form a static seal with the outer wall of said first groove and with the longer lip portion extending longitudinally into said second groove and forcibly contacting said seal ring on a surface opposite its dynamic sealing surface to form a static seal therewith with the longer lip portion being elastically deformed by reason of the interference fit of said compression member within said second groove to continuously bias said seal ring into engagement with the surface of the piston rod substantially independently of fluid pressure whereby said seal ring forms a dynamic fluid seal with the surface of the piston rod.

References Cited in the file of this patent

UNITED STATES PATENTS

| | | |
|---|---|---|
| 1,700,894 | Joyce et al. | Feb. 5, 1929 |
| 2,342,458 | Davies | Feb. 22, 1944 |
| 2,745,660 | Delahay | May 15, 1956 |
| 2,745,704 | D'Errico | May 15, 1956 |

FOREIGN PATENTS

| | | |
|---|---|---|
| 206,792 | Switzerland | Aug. 31, 1939 |